Dec. 9, 1941.    R. LEE    2,265,296
MAGNETIC MODULATOR
Filed Aug. 16, 1940
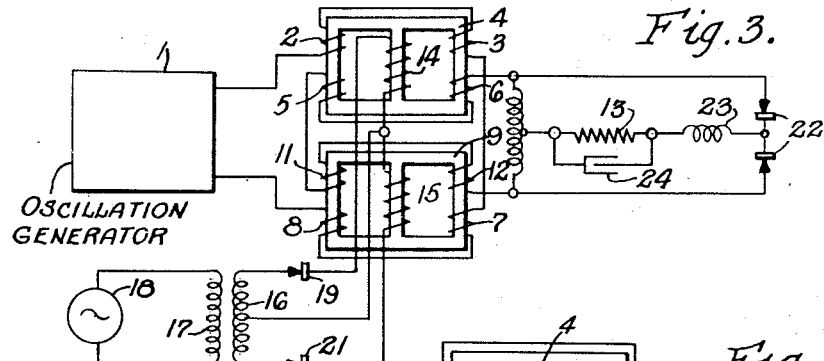
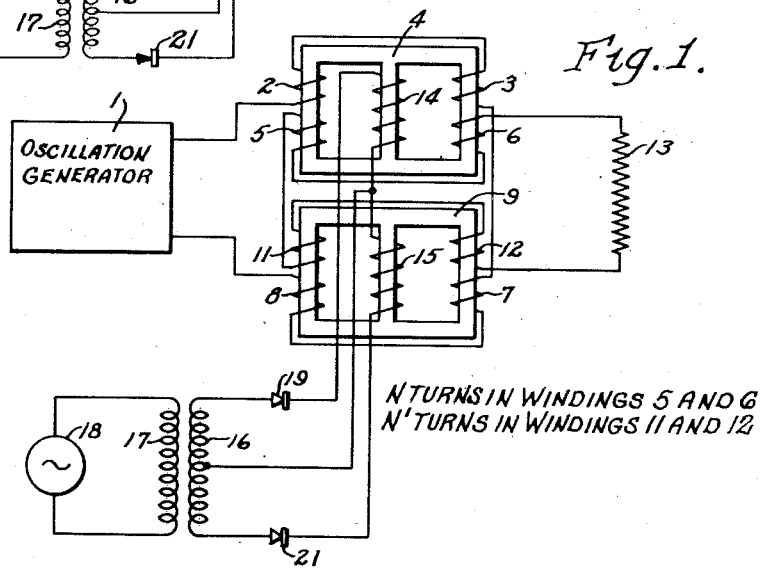
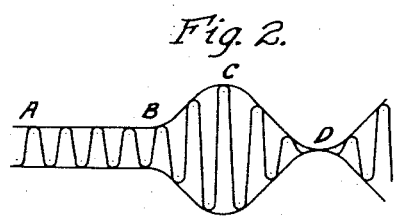
WITNESSES:
Leon M. Garman
Nm. C. Groome
INVENTOR
Reuben Lee.
BY
F. W. Lyle.
ATTORNEY Patented Dec. 9, 1941

2,265,296

UNITED STATES PATENT OFFICE 2,265,296

MAGNETIC MODULATOR

Reuben Lee, Catonsville, Md., assignor to Westinghouse Electric & Manufacturing Company, East Pittsburgh, Pa., a corporation of Pennsylvania Application August 16, 1940, Serial No. 352,890

5 Claims. (Cl. 179—171.5)

My invention relates to means for modulating alternating currents and, in particular, relates to such modulators in which reactors are employed to produce the modulation of a carrier wave.

One object of my invention is to provide an arrangement in which alternating current derived from a voltage source of substantially constant amplitude may be modulated in amplitude by an alternating current having a lower frequency than that of said source.

Another object of my invention is to provide an arrangement whereby an alternating current derived from an alternating voltage source of substantially constant amplitude may be modulated in accordance with the alternations of an alternating source having a lower frequency than that of the source first mentioned.

Still another object of my invention is to provide an arrangement whereby alternating current derived from an alternating voltage source of substantially constant amplitude may be modulated by means of a reactor having a magnetic circuit of which the reluctance is periodically varied in accordance with the alternations of an alternating voltage source of lower frequency than the first-mentioned source.

Still another object of my invention is to provide an arrangement in which a variable reactor is employed to modulate the current derived from an alternating voltage source of substantially constant amplitude in accordance with the alternations of an auxiliary voltage source having a power output relatively small compared to that of the first-mentioned source.

Other objects of my invention will become apparent upon reading the following specification taken in connection with the drawing, in which:

Figure 1 is a schematic diagram of a circuit embodying the principles of my invention;

Fig. 2 is a graph of alternating-current waves which is used below in explaining the operation of the circuit of Fig. 1; and Fig. 3 is a schematic diagram of a device extending the principles of that shown in Figs. 1 and 2.

For many purposes, particularly in radio transmission, it is desirable to be able to modulate a carrier current wave of relatively high frequency in accordance with an alternating-current wave of lower frequency. It is also desirable to produce an electrical power output of substantial magnitude which varies in accordance with the fluctuations of a voltage source of relatively low frequency and small power output. I have discovered that either of the foregoing results may be obtained by transmitting power of higher frequency and relatively large value through windings of a reactor having a magnetic core, and passing periodic current from a source of relatively low power through a winding on this magnetic circuit so disposed as to vary the reluctance of the magnetic circuit from instant to instant in accordance with alternation of the low power source.

Specifically, I provide two three-legged iron cores. On the respective outside legs of one of these reactors, I mount a pair of primary windings connected to a high-frequency highpowered source and also mount a pair of secondary windings connected in series with each other. On the outside legs of the second threelegged core, I mount a set of primary windings which may be identical with each other, if desired, and of secondary windings which, likewise, may be identical with each other, and I so interconnect the secondary windings on the second core in series with the secondary windings on the first core that their voltages oppose each other in supplying current to a load circuit. I provide the middle legs of the two above-mentioned magnetic cores with a pair of windings, which windings are connected to a pair of rectifiers energized from the low-frequency lowpower source in such a way that one said winding is traversed by current during one-half cycle of the low-frequency source and the other said winding is traversed by said current during the other half cycle of the low-frequency source.

I so proportion the above-mentioned secondary windings that when no current flows through the windings on the middle legs of the magnetic cores, the voltages of the secondary windings are slightly different, as a result of which there is a net alternating voltage having the frequency of the high-power high-frequency source impressed upon the load circuit. The effect of the respective half cycles of current flowing through the windings on the middle leg of the magnetic core is by varying the reluctance of the magnetic circuits to alternately increase and decrease the amplitude of this net difference voltage which is impressed on the load circuit. As a result, this load circuit voltage is modulated in accordance with the momentary fluctuations, instant by instant, in the amplitude of the low-frequency voltage.

With the foregoing principles in mind, Figure 1 of the drawing shows a source 1 of alternating voltage which may be of any suitable type; for example, it may be a high-frequency electrical discharge tube oscillator. Current from the source 1 passes through windings 2, 3 which are positioned on the outside legs of a three-legged magnetic core 4. The same outside legs support a pair of secondary windings 5, 6, which windings are connected in series with each other. Primary windings 2, 3, are likewise connected in series with a pair of windings 7, 8, which windings are respectively positioned on the outside legs of a second three-legged reactor 9. The outside legs of the reactor 9 also carry a pair of secondary windings 11, 12 which are connected in series with each other and with the pair of secondary windings 5, 6 and with a load 13.

The respective middle legs of the magnetic cores 4 and 9 carry a pair of windings 14, 15, the adjacent terminals of which are connected together to the mid-point of a secondary winding 16 having a primary winding 17 connected to an alternating-current source 18 which may be of lower power and of lower frequency than the source 1. The opposite terminals of the windings 14 and 15 are connected through a pair of rectifiers 19 and 21 to the end terminals of the secondary winding 16.

The polarity of the windings 2, 3 is such that they aid each other in producing magnetic flux passing through the outside legs and the end yokes of the magnetic core 4. The polarity of the windings 5, 6 is such that their voltages are additive under the conditions just described. The polarity of the windings 7, 8 is such that they aid each other in passing magnetic flux in the path which includes the outside legs of the magnetic core 9 and its end yokes; and the polarity of the windings 11, 12 is such that they aid each other, but that their combined voltage is opposed to the voltage induced in the secondary windings 5, 6. The number of turns in the windings 5, 6, 11 and 12 is so proportioned that when no current flows in the windings 14 and 15, there is a net alternating voltage impressed upon the terminals of the load 13. To take one example, the windings 5, 6 may be so proportioned as to produce a voltage 4 and the windings 11 be so proportioned as to produce a voltage 3 which is 180 degrees out of phase with the latter when no current flows through the windings 14, 15. It will be evident that, under these conditions, the net voltage impressed across the terminals of the load 13 will be 4—3=1 volt. An alternating voltage, such as that represented between the points A and B in Fig. 2, is thus impressed on the terminals of load 13.

The mode of operation of the Fig. 1 arrangement will then be as follows: When the polarity of the source 18 is such that current flows through the rectifier 21 and winding 15, the magnetic permeability of the core 9 will be reduced because of magnetic saturation, and as a result the voltage induced by the windings 7, 8 in the windings 11, 12 will be decreased from the value 3 mentioned above. On the other hand, the permeability of the core 4 will remain unaltered, because the rectifier 19 permits no current to flow to the winding 14. Suppose that the winding 15 is so proportioned that the voltage induced in the windings 11, 12 is reduced from 3 to 2 volts. The net voltage impressed on the terminals of the load 13 then becomes 4—2=2 volts. This increased amplitude of the voltage impressed across the load 13 corresponds to the point C in Fig. 2.

One-half cycle of the alternating source 18 later, the rectifier 19 will be rendered conductive to transmit current through the winding 14, but the rectifier 21 will prevent the flow of any current through the winding 15. As a result of the increased saturation in the core 4, the voltage induced in windings 5, 6 may be decreased to 3 volts, whereas the voltage induced in the windings 11 and 12 is restored to its original value of 3 volts, as mentioned above. The net voltage impressed across the terminals of the load 13 is then 3—3=0 volt. This corresponds to the conditions represented by the letter D in Fig. 2. The amount of the decrease produced in the voltage of windings 5, 6 by current flow in winding 14 can be given any desired value, as will be evident to those skilled in the electrical design art. Usually it will be preferable to so design the windings on core 4 as to make the voltage of the windings 5, 6 exactly equal and opposite to the voltage of the windings 11, 12 when the periodic current through the winding 14 is at its maximum value.

If the voltage impressed by the source 18 on the winding 17 is of sinusoidal wave form, the fluctuations of the amplitude of the voltage shown in Fig. 2 will likewise approximate to a sinusoidal wave form. In short, a sinusoidal modulation having a frequency of the source 18 will be produced on the carrier frequency current flowing from the source 1 to the load 13.

By differently proportioning the number of turns in the windings 14 and 15, the magnetic flux of the modulation impressed upon the output of source 1 can be varied from that described above in ways which are too well known to those skilled in the electrical art to require extended description. For example, it is within the scope of my invention to so proportion the windings 5, 6, 11 and 12 that the net voltage which they impress upon the load 13 is zero when no current flows through windings 14 and 15. Flow of a fluctuating current from source 18 will then produce a modulated current through load 13.

It will be recognized that the values of 4 volts and 3 volts used in the foregoing illustration are merely exemplary and that the transformer windings may be so proportioned as to produce any desired multiple or fraction of these particular voltages or any combination thereof.

If desired a full-wave rectifier 22 may be inserted as in Fig. 3 between windings 5, 6, 11, 12 and load 13, in which case a direct current varying from a maximum to a minimum in accordance with the fluctuations of source 18, and of power equal to that drawn from source 1 (which may be many times the power of source 18) will flow through load 13. By filtering the alternating component from this fluctuating direct current, by any well-known means such as inductor 23 and capacitor 24, an amplified replica of the alternating current from source 18 is obtained.

Except as just mentioned, reference numerals in Fig. 3 designate corresponding elements to those similarly represented in Fig. 1 already described.

In accordance with the patent statutes, I have described a particular modification of my invention, but the broad principles thereof will be found applicable in many other ways which will be evident to those skilled in the art.

I claim as my invention:

1. An arrangement for modulating the current derived from an alternating-current source which comprises a magnetic core bearing primary and secondary windings and a tertiary winding supplied through a rectifier with current from an alternating voltage source in accordance with the fluctuations of which it is desired to modulate the first-mentioned source, a second magnetic core bearing primary and secondary windings connected in series, respectively, with the first-mentioned primary and secondary windings, the secondary windings on the second-mentioned core having a voltage 180 degrees out of phase with that of the secondary windings on the first-mentioned core but which is of smaller magnitude than that of the first-mentioned secondary windings, a tertiary winding on the second-mentioned core supplied with current through a rectifier connected to a point on said modulating voltage source which is 180 degrees out of phase with the voltage supplied to the first-mentioned rectifier, and a load connected in series with said two sets of secondary windings.

2. In combination with a source of carrier current voltage, a pair of three-legged magnetic cores having primary windings on their outside legs respectively connected in series with each other to said source and having secondary windings on their outside legs connected in phase opposition through a load, the voltage momentarily induced in the secondary windings of one core being less than the voltage momentarily induced in the secondary windings of the other core, a source of alternating voltage with which it is desired to modulate said carrier current having a neutral terminal and two end terminals, a winding on the middle leg of one said core connected through a rectifier between one outside terminal and the middle terminal of the last-mentioned source, and a winding on the middle leg of the other said core connected between the other outside terminal and said mid-terminal of the last-mentioned source.

3. In combination with a source of carrier current voltage, a pair of three-legged magnetic cores having primary windings on their outside legs respectively connected in series with each other to said source and having secondary windings on their outside legs connected in phase opposition through a load, the voltage momentarily induced in the secondary windings of one core being less than the voltage momentarily induced in the secondary windings of the other core, a source of alternating voltage with which it is desired to modulate said carrier current having a neutral terminal and two end terminals, a winding on the middle leg of one said core connected through a rectifier between one outside terminal and the middle terminal of the last-mentioned source, and a winding on the middle leg of the other said core connected between the other outside terminal and said mid-terminal of the last-mentioned source.

4. In combination with a source of carrier current, a first three-legged magnetic core having on its outside legs a primary winding and a secondary winding, a second three-legged magnetic core having on its outside legs a primary winding and a secondary winding, means for connecting the primary windings on said first magnetic core in series with the primary windings on said second magnetic core, means for connecting the secondary windings on said first magnetic core in series opposition to the secondary windings on said second magnetic core, the number of turns in the secondary windings on said first magnetic core being smaller than the number of turns in the secondary windings on said second magnetic core, a winding on the middle leg of the first magnetic core and means for supplying it with rectified current from a periodic source of modulating potential, a winding on the middle leg of said second magnetic core and means for supplying it with rectified current from said source of modulating potential, the current supplied by said second rectifier being 180 degrees out of phase with the current supplied through said first rectifier.

5. In combination with a source of carrier current having a substantially constant amplitude, a first three-legged magnetic core having on its outside legs a primary winding and a secondary winding, a second three-legged magnetic core having on its outside legs a primary winding and a secondary winding, means for connecting the primary windings on said first magnetic core in series with the primary windings on said second magnetic core, means for connecting the secondary windings on said first magnetic core in series opposition to the secondary windings on said second magnetic core, the number of turns in the secondary windings on said first magnetic core being smaller than the number of turns in the secondary windings on said second magnetic core, a winding on the middle leg of the first magnetic core and means for supplying it with rectified current from a periodic source of modulating potential, a winding on the middle leg of said second magnetic core and means for supplying it with rectified current from said source of modulating potential, the current supplied by said second rectifier being 180 degrees out of phase with the current supplied through said first rectifier.

REUBEN LEE.